(12) United States Patent
Wansley

(10) Patent No.: US 9,278,579 B2
(45) Date of Patent: Mar. 8, 2016

(54) AUTOMOBILE SALT DISPENSER

(76) Inventor: Judy Wansley, Antioch, TN (US)

(*) Notice: Subject to any disclaimer, the term of this patent is extended or adjusted under 35 U.S.C. 154(b) by 0 days.

(21) Appl. No.: 13/405,775

(22) Filed: Feb. 27, 2012

(65) Prior Publication Data
US 2012/0326454 A1    Dec. 27, 2012

Related U.S. Application Data

(60) Provisional application No. 61/446,618, filed on Feb. 25, 2011.

(51) Int. Cl.
*B60B 39/04* (2006.01)
*B60B 39/02* (2006.01)

(52) U.S. Cl.
CPC .............. *B60B 39/04* (2013.01); *B60B 39/022* (2013.01); *B60Y 2200/11* (2013.01)

(58) Field of Classification Search
CPC ........ B60B 39/04; B60B 39/10; B60B 39/00; B60B 39/02; B60B 39/022; B61C 15/107
USPC ............ 291/22, 23, 38, 39, 40, 41, 44, 46, 25
See application file for complete search history.

(56) References Cited

U.S. PATENT DOCUMENTS

| | | | | | |
|---|---|---|---|---|---|
| 1,604,168 | A | * | 10/1926 | Clarence | 291/28 |
| 1,797,898 | A | * | 3/1931 | Cook | 291/5 |
| 2,909,383 | A | * | 10/1959 | Nanfeldt | 291/23 |
| 2,999,711 | A | * | 9/1961 | Sturmer | 291/3 |
| 5,118,142 | A | * | 6/1992 | Bish | 291/46 |
| 5,367,278 | A | * | 11/1994 | Yoshikawa | 335/285 |
| 5,460,305 | A | * | 10/1995 | Ahearn | 224/562 |
| 7,976,076 | B1 | * | 7/2011 | Ahern | 291/38 |

* cited by examiner

*Primary Examiner* — Mark Le
(74) *Attorney, Agent, or Firm* — W. Edward Ramage; Baker Donelson

(57) ABSTRACT

An apparatus to dispense salt, sand, brine or similar material under or in the area of a tire on a motor vehicle, including, but not limited to, a truck or automobile. The apparatus comprises one or more containers for storing salt, sand, brine, or similar material that can be used to melt or provide traction on snow or ice. One or more tubes or lines run from the container(s) to a position above or near a vehicle wheel, or in the wheelwell, where the salt, sand, brine or similar material can be dispensed via a dispenser directly onto the snow or ice under or proximate to the tire, or onto the tire itself. A pump is used to pump the salt, sand, brine or similar material through the lines. The pump may be integrated with the container, or may be separately installed.

10 Claims, 4 Drawing Sheets

AUTOMOBILE SALT DISPENSER

This application claims benefit of and priority to U.S. Provisional Application No. 61/446,618, filed Feb. 25, 2011, by Judy Wansley, and is entitled to that filing date for priority. The specification, figures and complete disclosure of U.S. Provisional Application No. 61/446,618 are incorporated herein by specific reference for all purposes.

FIELD OF INVENTION

This invention relates to an apparatus to dispense salt, sand, brine or similar material under or in the area of a tire on a motor vehicle.

BACKGROUND OF THE INVENTION

The problems of winter driving in many parts of the world are well-known. Vehicles frequently slip, skid or get stuck in or on snow and ice. A variety of techniques and methods have been used to attempt to overcome this problem. Many such prior art devices are difficult to attach to the vehicle's wheels or tires, or require special tires or wheels. Examples include tire chains, tire traction devices, and tires with special treads or studs, such as those disclosed in U.S. Pat. Nos. 7,426,949; 6,536,491; 6,047,754; 5,322,107; and 5,198,048; all of which are incorporated herein in their entireties by specific reference for all purposes.

The need continues, however, for a way to increase traction for a vehicle when needed without special tires, or without special equipment attached to the tires.

SUMMARY OF INVENTION

In various exemplary embodiments, the present invention comprises an apparatus to dispense salt, sand, brine or similar material under or in the area of a tire on a motor vehicle, including, but not limited to, a truck or automobile. The apparatus comprises one or more containers for storing salt, sand, brine, or similar material that can be used to melt or provide traction on snow or ice. One or more tubes or lines run from the container(s) to a position above or near a vehicle wheel, or in the wheelwell, where the salt, sand, brine or similar material can be dispensed via a dispenser directly onto the snow or ice under or proximate to the tire, or onto the tire itself. In one embodiment, a pump is used to pump the salt, sand, brine or similar material through the lines. The pump may be integrated with the container, or may be separately installed.

The container may be made of any suitable material to hold the salt, sand, brine, or similar material, and may be rigid, flexible, or semi-rigid. The lines also may be made of any suitable material, and may be rigid or flexible, in whole or in part.

In one embodiment, the tubes or lines are run only to drive wheels (e.g., rear wheels for rear-wheel drive, front wheels for front-wheel drive). For vehicles with multiple drive wheels (such as an all-wheel drive vehicle), tubes or lines may be run to some or all of the wheels. In one embodiment, the tubes or lines are run on the exterior of the vehicle body, and are positioned down and in the wheelwell. In another embodiment, the tubes or lines are run on the interior on the vehicle body, and emerge at some point, or multiple points, in the wheelwell. For example, they may emerge at the top of the wheelwell so the material is dispensed onto the top of the tire, and carried down by tire rotation. Alternatively, they may emerge at the front (or back) of the wheel and are directed so that the material is dispensed onto the snow or ice immediately in front of, or in back of, or underneath, the tire. Multiple lines may run to a single or multiple wheelwells, or a single line with a single outlet or multiple outlets may be used. Each line may run to its own container, or a single container may provide material for multiple lines.

In one exemplary embodiment, the container or containers are located on the interior of the vehicle (e.g., in a trunk or body cavity). In another embodiment, the container or containers are located on the exterior of the vehicle body, and removably affixed thereto. For example, the container may comprise a waterproof canvas or vinyl or plastic sack that has two tubes or lines emitting from either end. Magnetic strips are affixed to one side so that container may be removably affixed to the back or hood of the vehicle. In an alternative embodiment, a separate wedge or holding device may be affixed to the vehicle (such as by magnetic strips), and the container held in place by the wedge or holding device.

In one embodiment, the release of salt, sand, brine, or other material may be triggered by a button or switch by the driver of the vehicle. Alternatively, the button or switch may be on the container or apparatus itself.

DETAILED DESCRIPTION OF EXEMPLARY EMBODIMENTS

Figure 1:
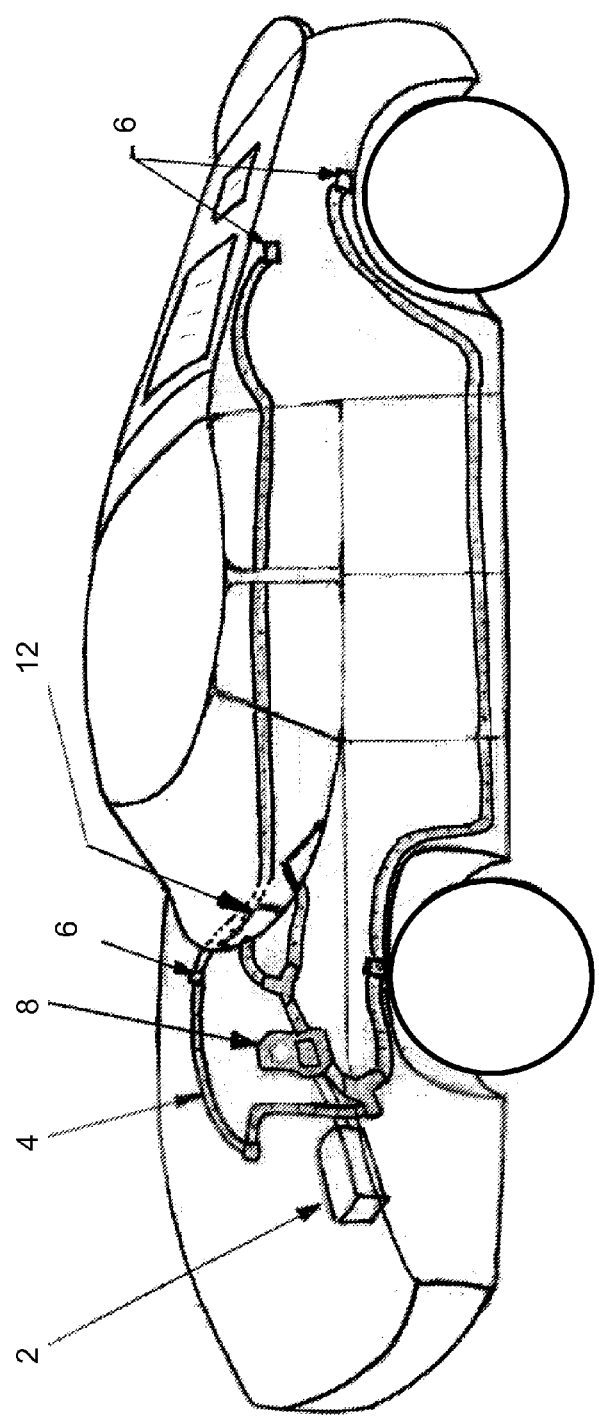
FIG. 1 shows a view of a system in accordance with an embodiment of the present invention.
Figure 2:
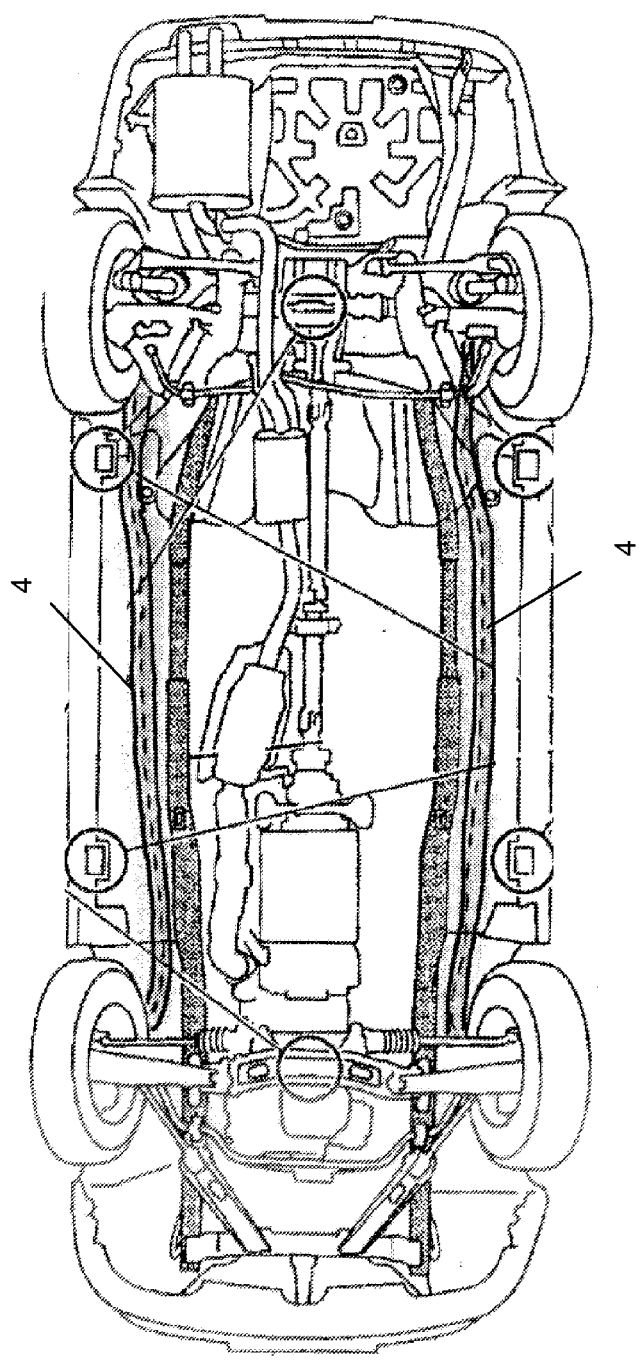
FIG. 2 shows another view of the system of FIG. 1.
Figure 3:
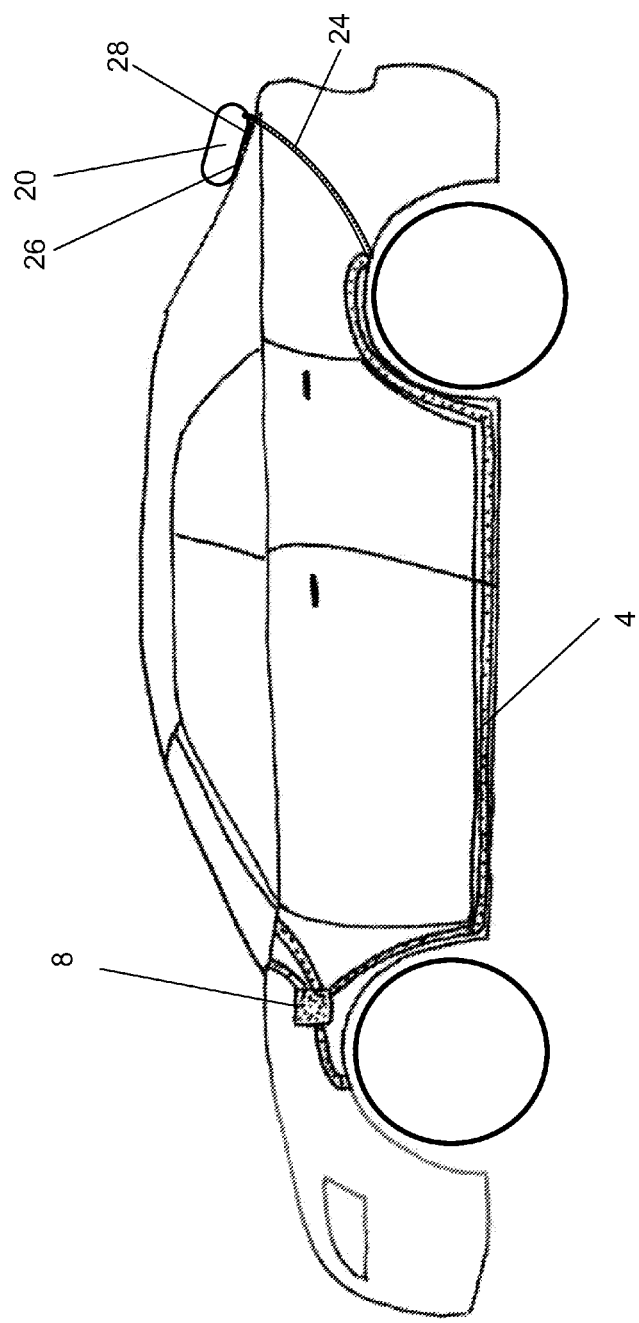
FIG. 3 shows a view of another system in accordance with another embodiment of the present invention.

In various exemplary embodiments, as shown in FIGS. 1-3, the present invention comprises an apparatus to dispense salt, sand, brine or similar material under or in the area of a tire on a motor vehicle, including, but not limited to, a truck or automobile. The apparatus comprises one or more containers 2 for storing traction material, such as, but not limited to, salt, sand, brine, or similar material that can be used to melt or provide traction on snow or ice. One or more tubes or lines 4 run from the container(s) to a position above or near a vehicle wheel, or in the wheelwell, where the salt, sand, brine or similar material can be dispensed via a dispenser 6 directly onto the snow or ice under or proximate to the tire, or onto the tire itself. In one embodiment, a pump 8 is used to pump the salt, sand, brine or similar material through the lines. The pump may be integrated with the container, or may be separately installed.

The container may be made of any suitable material to hold the salt, sand, brine, or similar material, and may be rigid, flexible, or semi-rigid. The lines also may be made of any suitable material, and may be rigid or flexible, in whole or in part.

In one embodiment, the tubes or lines are run only to drive wheels (e.g., rear wheels for rear-wheel drive, front wheels for front-wheel drive). For vehicles with multiple drive wheels (such as an all-wheel drive vehicle), tubes or lines may be run to some or all of the wheels, as shown in FIG. 1. Lines also may run to the windshield area, or to the windshield wipers 12.

In one embodiment, the tubes or lines are run on the exterior of the vehicle body, and are positioned down and in the wheelwell. In another embodiment, as seen in FIG. 1-3, the tubes or lines are run on the interior on the vehicle body, and emerge at some point, or multiple points, 6 in the wheelwell. For example, they may emerge at the top of the wheelwell so the material is dispensed onto the top of the tire, and carried down by tire rotation. Alternatively, they may emerge at the front (or back) of the wheel and are directed so that the material is dispensed onto the snow or ice immediately in front of, or in back of, or underneath, the tire. Multiple lines may run to a single or multiple wheelwells, or a single line with a single outlet or multiple outlets may be used. Each line may run to its own container, or a single container may provide material for multiple lines.

Figure 4:
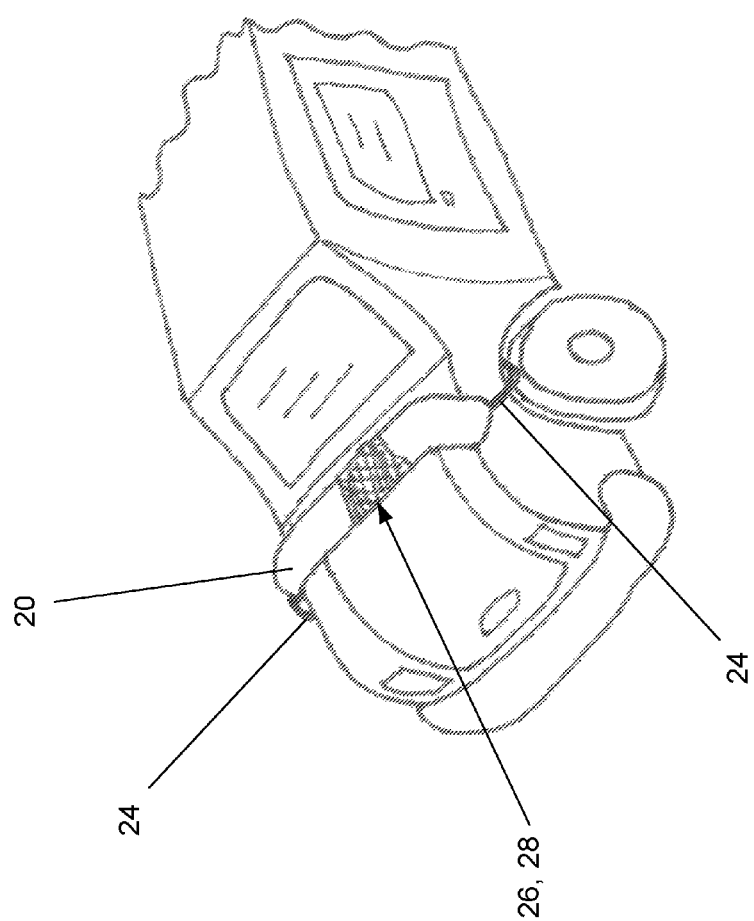
FIG. 4 shows a view of an alternative embodiment of the present invention.

In one exemplary embodiment, the container or containers 2 are located on the interior of the vehicle (e.g., in a trunk or body cavity). In another embodiment, the container or containers are located on the exterior of the vehicle body (FIG. 4), and removably affixed thereto. For example, the container may comprise a waterproof canvas or vinyl or plastic sack 20 that has two tubes or lines 24 emitting from either end. Magnetic strips 26 are affixed to one side so that container may be removably affixed to the back or hood of the vehicle. In an alternative embodiment, a separate wedge 28 may be affixed to the vehicle (such as by magnetic strips 26), and the container held in place by the wedge.

In one embodiment, the release of salt, sand, brine, or other material may be triggered by a button or switch by the driver of the vehicle. Alternatively, the button or switch may be on the container or apparatus itself.

It should be understood that the embodiments and examples described herein have been chosen and described in order to best illustrate the principles, methods, and processes of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A device for dispensing a traction material for a wheeled motor vehicle, comprising:
   a single container removably affixed to an exterior of said motor vehicle for storing said traction material, said container comprising a sack made of waterproof material with a wedge provided with magnetic strips affixed on a side of said container; and
   two or more tubes or lines independently carrying said traction material from separate emission points on the container to two or more dispensing points located in or near at least two wheels on the motor vehicle;
   whereby the single container and tubes deliver traction material to at least two wheels on the motor vehicle;
   further wherein the single container is affixed to said exterior of said motor vehicle at a height above the at least two wheels.

2. The device of claim 1, wherein the traction material is brine, salt or sand.

3. The device of claim 1, wherein each said tube or line runs to each said dispensing point.

4. The device of claim 1, wherein the dispensing points are in two or more wheelwells on the motor vehicle.

5. The device of claim 4, wherein at least some of the dispensing points are located directly above the wheel in the wheelwell.

6. The device of claim 4, wherein the traction material is dispensed directly onto the wheel.

7. The device of claim 4, wherein the traction material is dispensed onto the ground in front or in back of the wheel.

8. The device of claim 1, wherein the release of traction material is triggered by a button or switch located in the driver's compartment of the motor vehicle.

9. The device of claim 1, further comprising a pump.

10. The device of claim 1, wherein the container is affixed to a back or hood of said motor vehicle.

\* \* \* \* \*